United States Patent [19]
Yates

[11] Patent Number: 5,274,685
[45] Date of Patent: Dec. 28, 1993

[54] NON-LEVITATING PWR FUEL ASSEMBLY

[75] Inventor: Jack Yates, Richland, Wash.

[73] Assignee: Siemens Power Corporation, Richland, Wash.

[21] Appl. No.: 950,879

[22] Filed: Sep. 24, 1992

[51] Int. Cl.$^5$ ............................................. G21C 15/00
[52] U.S. Cl. ..................................... 376/364; 376/446
[58] Field of Search ............... 376/364, 446, 448, 302, 376/437; 976/DIG. 102, DIG. 104

[56] References Cited

U.S. PATENT DOCUMENTS

| | | | |
|---|---|---|---|
| Re. 31,583 | 5/1984 | Klumb | 376/364 |
| 3,389,056 | 6/1968 | Frisch | 376/364 |
| 3,475,273 | 10/1969 | Krawiec | 176/78 |
| 3,515,638 | 6/1970 | Nims, Jr. | 176/28 |
| 3,600,276 | 8/1971 | Nims, Jr. | 376/221 |
| 3,689,358 | 5/1972 | Smith | 176/78 |
| 3,769,158 | 10/1973 | Winders | 176/78 |
| 3,770,583 | 11/1973 | Klumb | 176/76 |
| 3,801,453 | 4/1974 | Jones | 176/78 |
| 3,853,703 | 12/1974 | Anthony et al. | 376/364 |
| 4,072,562 | 2/1978 | Sankovich | 176/50 |
| 4,072,564 | 2/1978 | Jabsen | 176/76 |
| 4,076,586 | 2/1978 | Bideau | 176/78 |
| 4,078,969 | 3/1978 | Garin | 176/87 |
| 4,134,790 | 1/1979 | Bevilacqua et al. | 376/364 |
| 4,192,716 | 3/1980 | Anthony | 176/78 |
| 4,208,249 | 6/1980 | Jabsen | 176/78 |
| 4,278,501 | 7/1981 | Steinke | 176/78 |
| 4,309,251 | 1/1982 | Anthony et al. | 376/446 |
| 4,420,457 | 12/1983 | LePargneux | 376/446 |
| 4,427,624 | 1/1984 | Marlatt | 376/352 |
| 4,534,933 | 8/1985 | Gjertsen | 376/364 |
| 4,551,300 | 11/1985 | Feutrel | 376/364 |
| 4,560,532 | 12/1985 | Barry | 376/434 |
| 4,631,166 | 12/1986 | Camden | 376/435 |
| 4,645,642 | 2/1987 | Leclercq | 376/364 |
| 4,671,924 | 6/1987 | Giertsen | 376/285 |
| 4,729,868 | 3/1988 | Gillett | 376/285 |
| 4,762,661 | 8/1988 | Leclercq | 376/209 |
| 4,792,429 | 12/1988 | Hatfield | 376/446 |
| 4,938,919 | 7/1990 | Rylatt | 376/446 |
| 4,986,960 | 1/1991 | Larson | 376/446 |
| 5,053,191 | 10/1991 | Bryan et al. | 376/446 |

Primary Examiner—Donald P. Walsh
Assistant Examiner—Meena Chelliah
Attorney, Agent, or Firm—Ira Lee Zebrak

[57] ABSTRACT

An arrangement for supporting a fuel assembly of a nuclear reactor has upper and lower reactor core support plates, upper and lower tie plates for supporting fuel rods and a coolant path through the assembly. The improvement comprises a redesigned lower tie plate for providing an upward biasing force to the assembly for forcing the upper tie plate against the upper reactor core support plate. The biasing force is in the same direction as a levitation force caused by coolant flow through the assembly. In a preferred form, the tie plate includes an upper and lower section with hold-up springs disposed between the two sections.

7 Claims, 3 Drawing Sheets

NON-LEVITATING PWR FUEL ASSEMBLY

BACKGROUND OF THE INVENTION

1. Field of the Invention

The present invention relates to mechanisms for securing a nuclear reactor fuel assembly to its support and, in particular, a spring driven mechanism for avoiding levitation effects caused by coolant flow in the fuel assembly.

2. Background of the Related Art

It has long been known that the coolant flow rate in modern nuclear reactors can be so large that the weight of the fuel assembly is insufficient to prevent the assembly from being lifted off the core support stand. One solution to overcome this problem is shown in FIG. 1. There, hold-down springs 16 are provided between the upper tie plate 12 of the reactor core and the upper support plate 14. Force provided by the hold-down springs is designed to overcome the levitation force created by the coolant flow through the fuel assembly. Without the springs, the fuel assembly will levitate, a condition which can result in fretting damage to the fuel assembly and the location pins 2 in the reactor upper and lower core support plates.

Under normal operation, the downward force of the hold-down springs is greater than the upward levitation force and the fuel assembly 10 remains seated on the lower core support plate 15. Whenever the levitation force exceeds the hold-down force, however, levitation occurs. This happens during coolant pump overspeed events and could also happen if all cooling pumps were operated during cold conditions. It should be noted here that the higher density of the cold coolant results in higher levitation forces. It should also be noted that there are limitations on the allowable force that may be applied to the reactor upper core plate which prevent incorporation of stiff springs which would hold the fuel assembly down under all conditions.

In the known hold-down design, there is nothing that can be done to prevent levitation during a pump overspeed event but reactor operational limitations are imposed on the allowable coolant flow through the assembly during start up from a cold shut down. The known procedure involves starting the coolant pumps in sequence as the coolant heats up. Such cold start-up flow limitations increase the time it takes for the reactor to reach full temperature and power by several hours. Economic and other operational considerations make it desirable for the reactor to be able to reach full power as quickly as possible.

This known use of hold-down mechanisms for overcoming the coolant flow levitation effect is indicated by a multiplicity of patents with variations on this theme. U.S. Pat. Nos. 4,278,501, 4,534,933, 4,671,924 and 4,986,960 are typical of a number of these hold-down approaches discussed above. These approaches employ the concept of holding down the nuclear fuel assembly by a force which is opposite to the direction of the levitation force created by the coolant flow. All of these prior art approaches are limited in various respects since there may always be a levitation force created by coolant flow which exceeds the hold-down force provided by the hold-down mechanism. There have also been attempts to employ other means for holding down the nuclear fuel assembly such as the use of a latch device oriented in the lower support of the fuel assembly as disclosed in U.S. Pat. No. 4,309,251. Such device is only applicable to C. E. type fuel with a large central tube to contain the latch operating push rod. This approach also requires a notched reactor pin. Such pins are normally not notchable. It would be prohibitively expensive to utilize such design for retrofitting purposes.

OBJECTS AND SUMMARY OF THE INVENTION

It is a primary object of the present invention to overcome the problems associated with hold-down mechanisms for nuclear fuel rod assemblies.

It is a further object of the invention to provide a mechanism for overcoming and compensating for levitation effects caused by coolant flow through a nuclear fuel assembly.

It is yet another object of the present invention to provide a mechanism for compensating for levitation forces created by coolant flow through a nuclear assembly which does not limit the amount of coolant flow during start up operations and which is not subject to deleterious effects caused by coolant pumps overspeed events.

In accordance with the invention, in an arrangement for supporting a fuel assembly of a nuclear reactor having upper and lower reactor core support plates, upper and lower tie plates for supporting fuel rods and a coolant path through the assembly, the improvement comprising means forming part of the lower tie plate for providing an upward biasing force to the assembly so as to force the upper tie plate against the upper reactor core support plate, the biasing force being in the same direction as a levitation force caused by coolant flow through the assembly. In a particular form of the invention, the means includes a two part tie plate having an upper section and a lower section with spring means disposed between said upper and lower sections.

For a better understanding of the present invention, reference is made to the following description and accompanying drawings while the scope of the invention will be pointed out in the appended claims.

DETAILED DESCRIPTION OF THE INVENTION, PREFERRED EMBODIMENTS AND BEST MODE

Figure 1:
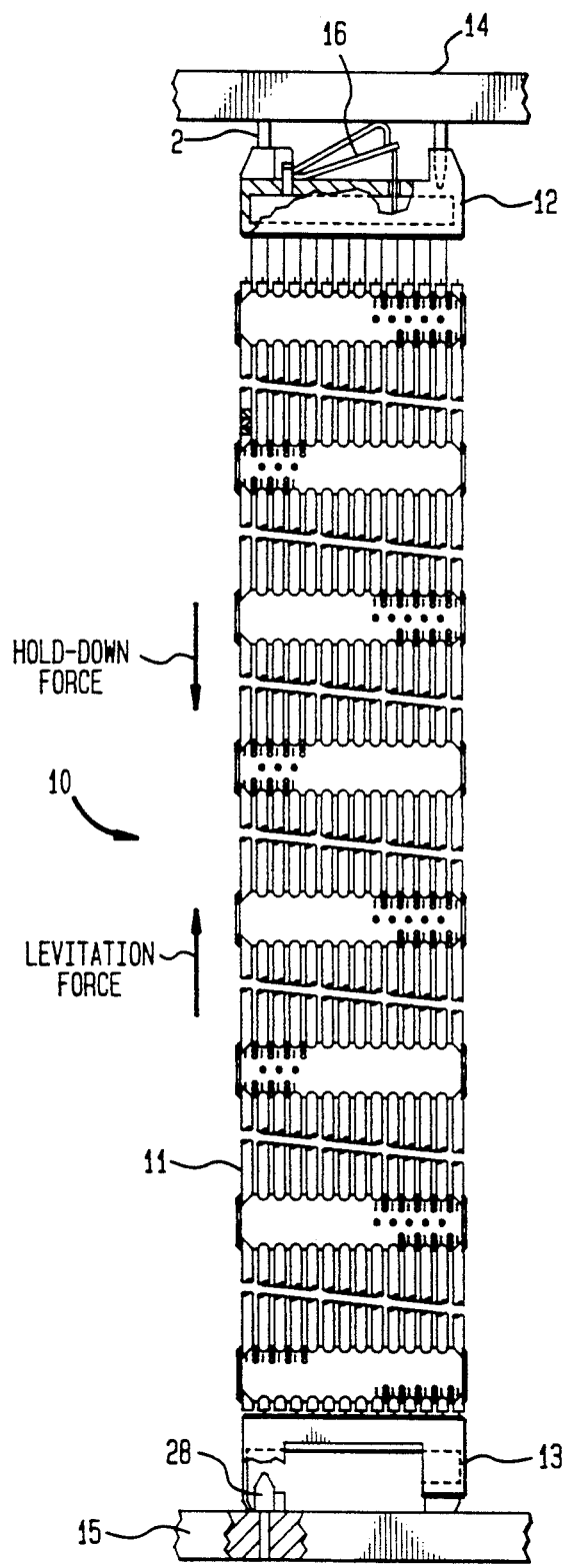
FIG. 1 is an illustration in cross-section of a known reactor fuel assembly employing hold-down means.
Figure 2:
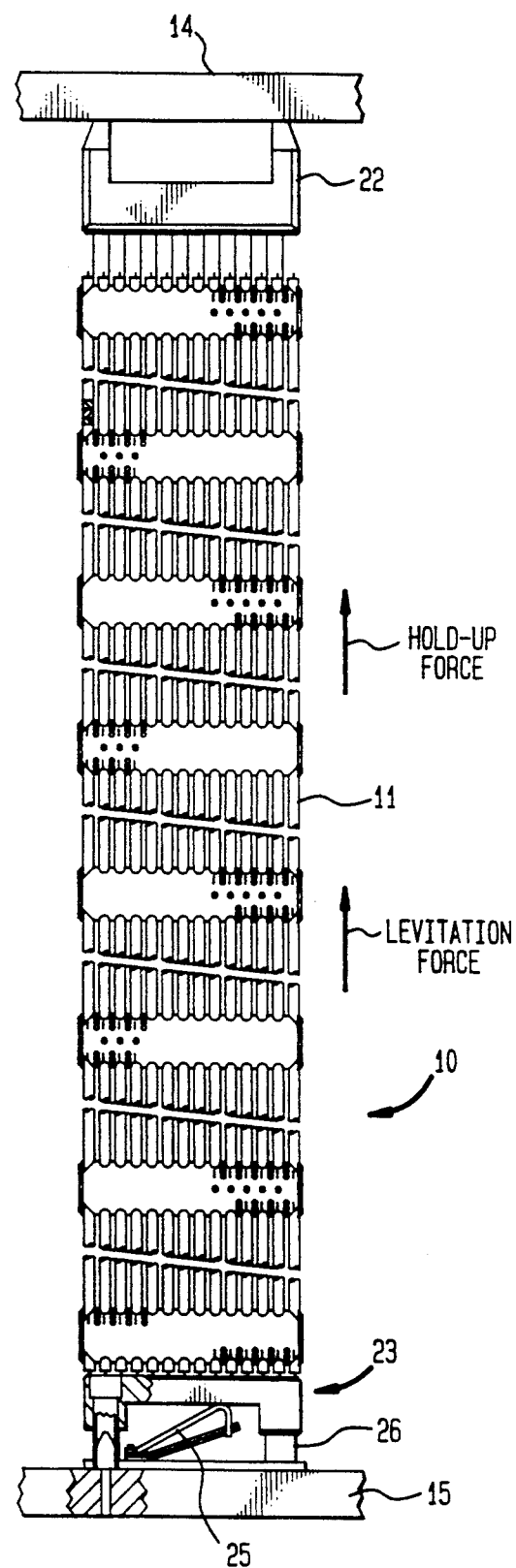
FIG. 2 is a cross-section of a design in accordance with the present invention.

The embodiment of the invention shown in FIG. 2 eliminates levitation force problems in PWR fuel assemblies. In this embodiment (which utilizes the same element numbers as in FIG. 1 for like elements), a fuel assembly for a nuclear reactor 10 is shown having a fuel rod array 11. The upper tie plate 22 incorporates no hold-down springs as in the prior art design shown in FIG. 1. Instead, hold-up springs 25 are included in the lower tie plate 23. The hold-up springs 25 perform the function of holding the fuel assembly against the reactor upper core plate 14. In this manner the levitation force caused by the coolant flow also works in the same direction to hold up the fuel assembly. The fuel assembly will remain stable and in contact with the reactor upper core plate under all conditions, hot or cold, with or without coolant flow or during pump overspeed conditions. Levitation concerns then would not necessitate any operational limitations during heating from cold shut down.

Figure 3A:
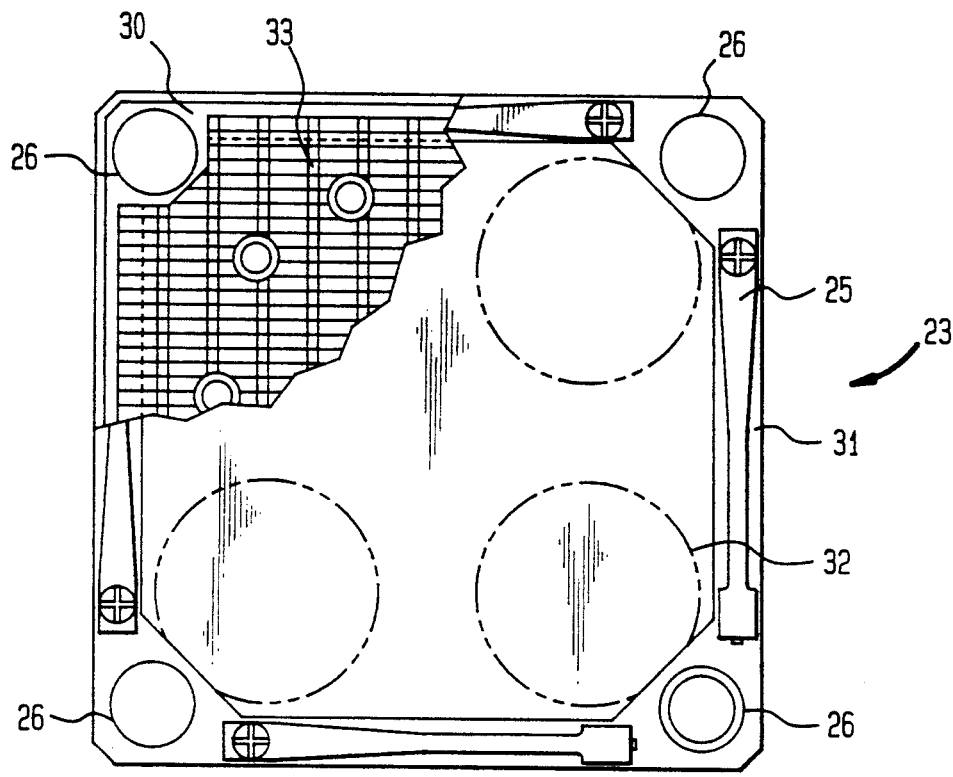
FIG. 3a is a partially broken away plan view of upper and lower sections of the lower tie plate.
Figure 3B:
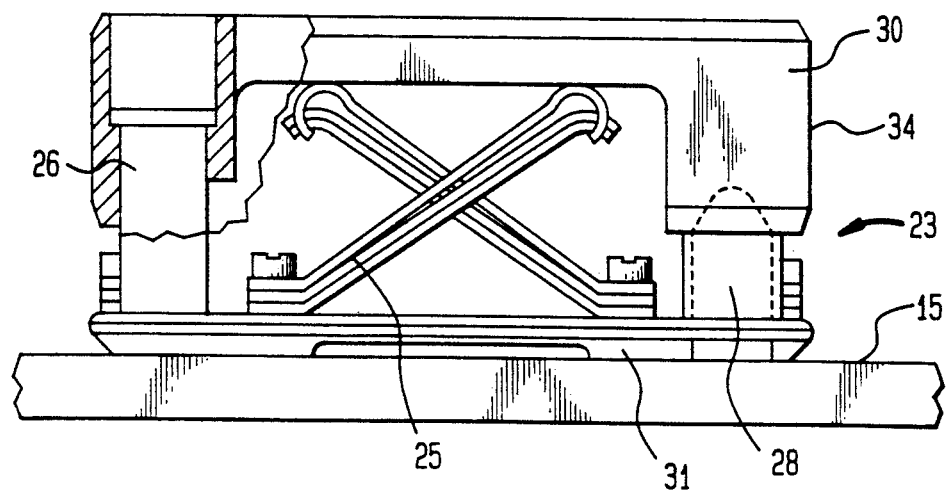
FIG. 3b is a partially broken away side view of the assembled lower tie plate of the present invention.

The details of the lower tie plate construction 23 is shown in FIGS. 3a and 3b. It should be pointed out that with this construction, no changes are necessary in the interfacing reactor hardware and the axial location of the fuel assembly spacers and the active fuel length may remain unchanged. The lower tie plate 23 is a two piece assembly with upper and lower sections 30 and 31 respectively. The lower section 31 is preferably constructed as a square frame surrounding coolant holes 32 in the reactor lower core support plate 15. The lower section incorporates four sets of three cantilever leaf springs 25 and includes a pin 26 at each corner. Two of the pins 26 are hollow to accept the reactor location pins 28.

The upper section 30 consists of a conventional grid 33 containing flow holes. It includes necessary means to attach the upper section to the fuel assembly guide tube lower ends and also necessary protrusions 34 extending downwardly to engage the four pins in the lower section in order to allow a vertical sliding action between upper and lower sections.

In assembly the upper and lower sections are assembled so that they are pre-loaded by the springs, the spring force being greater than the assembly weight. Differential lengths due to fuel assembly and reactor tolerances and length changes due to assembly growth would be accommodated by the sliding engagement of the upper and lower sections and the springs.

Figure 4B:
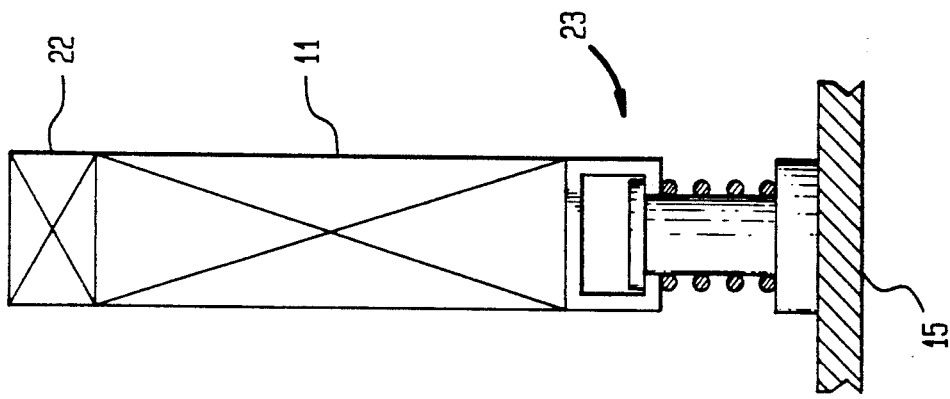
FIG. 4b is a similar cross-section showing the assembly of the present invention outside of the reactor core.
Figure 4A:
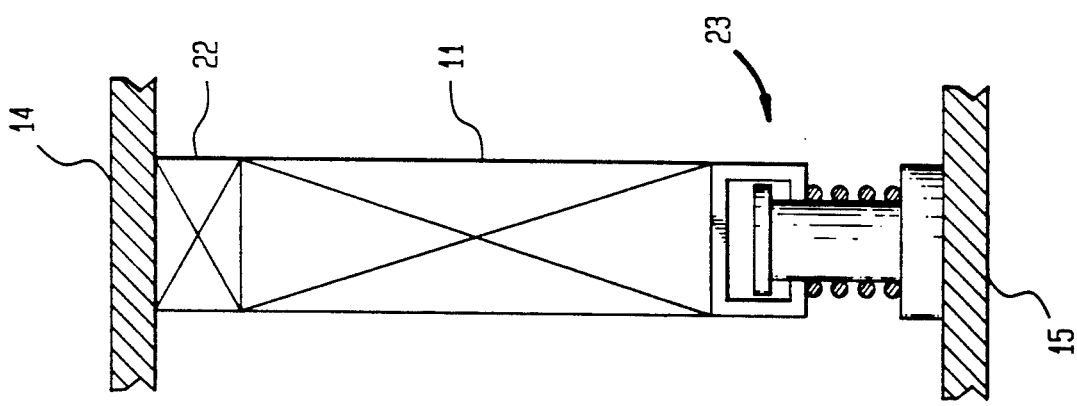
FIG. 4a is a cross-section of the present invention is schematic form showing incorporation of the lower tie plate in the reactor core.

Reference to FIGS. 4a and 4b indicates the essential nature of the fuel assembly when it is in the core (FIG. 4a) and when it is out of the core (FIG. 4b). In the core, springs 25 deflect to absorb the assembly and core length tolerances and to allow for assembly growth. Outside of the core, when unrestrained, the spring force, being greater than the assembly weight, will solidify the upper and lower sections of the lower tie plate and the fuel assembly will sit on the lower tie plate in a stable manner. In other words the assembly will not "feel" the effect of the springs.

The design of the invention shown in FIGS. 3a and 3b is of a type to be applied to a Westinghouse PWR fuel assembly. Other arrangements which could accomplish the same objective would be understood by one skilled in the art incorporating the inventive features which require: a high force spring design, a split tie plate with a sliding fit, a compact design to allow existing spacer and fuel axial location, compatibility with existing location pins and no interference with core plate flow holes. Other PWR designs such as the KWU 16×16 and 18×18 fuel assemblies could be modified to adopt the inventive features.

While the foregoing description and drawings represent the preferred embodiments of the present invention, it will be obvious to those skilled in the art that various changes and modifications may be made therein without departing from the true spirit and scope of the present invention.

What is claimed is:

1. In an arrangement for supporting a fuel assembly of a nuclear reactor having upper and lower reactor core support plates, upper and lower tie plates for supporting fuel rods and a coolant path through the assembly, the improvement comprising:

means forming part of said lower tie plate for providing an upward biasing force to said assembly so as to force said upper tie plate against said upper reactor core support plate, said means including a two-part tie plate having an upper section and a lower section with spring means disposed between said upper section and lower section, said spring means being loaded with a force sufficient to maintain the assembly against the upper reactor core support under all reactor conditions, said biasing force being in the same direction as a levitation force caused by coolant flow through the assembly.

2. The arrangement of claim 1 wherein said spring means are cantilever leaf springs.

3. A fuel assembly for a nuclear reactor core comprising:

a fuel rod array having upper and lower tie plates;
upper and lower reactor core support plates for supporting said array; and
means for supplying coolant through said assembly;
said lower tie plate including spring driven means for biasing said upper tie plate against said upper core support plate under all conditions of reactor operation, said lower tie plate having an upper section and a lower section with spring means disposed between said upper and lower section with spring means disposed between said upper and lower sections.

4. The fuel assembly of claim 3 wherein said spring means are pre-loaded such that outside of the cove when unrestrained, the spring force, being greater than the assembly weight, will solidify the upper and lower sections of said lower tie plate.

5. The fuel assembly of claim 3 wherein said spring means are cantilever leaf springs.

6. The fuel assembly of claim 3 wherein said lower section includes a substantially square frame surrounding coolant holes in the reactor core lower support plate, four sets of cantilever leaf springs and a pin located respectively at each corner of said frame, and said upper section having a grid containing coolant flow holes and having means to engage said pins by sliding action.

7. The fuel assembly of claim 6 including means in said upper portion for attaching a lower end of a fuel assembly guide and wherein two of said pins are hollow for accepting reactor location pins.

* * * * *